Patented Feb. 29, 1944

2,343,151

UNITED STATES PATENT OFFICE

2,343,151
METHOD OF PROCESSING DOLOMITE

Walter H. MacIntire, Knoxville, Tenn., assignor to American Zinc, Lead & Smelting Company, St. Louis, Mo., a corporation of Maine No Drawing. Application August 3, 1940, Serial No. 351,189

9 Claims. (Cl. 23—201)

This invention pertains to a new method of processing dolomite wherein some form of silica is added to the dolomite to produce certain desired chemical compounds.

One object of the present invention is to combine dolomite and silica to obtain a product which is substantially a mixture of a relatively inactive calcium silicate and magnesium oxide.

Another object of the invention is to form a by-product of the full carbon dioxide content of the starting dolomite.

Another object is to obtain a product of dolomitic proportion from which the MgO can be removed with facility by either chemical or mechanical means.

A further object is to transform dolomite into two compounds of different physical and chemical properties to facilitate their separation by mechanical operations, as well as by chemical means, to overcome the difficulty encountered in making effective mechanical separation of the calcic and magnesic components of such related materials as selectively calcined dolomite, or $CaCO_3 \cdot MgO$.

Other and further objects of the invention will become apparent as this specification proceeds.

The new process is preferably carried out as follows: Raw dolomite is pulverized to any desired degree of fineness and is intimately mixed with some form of silica; i. e., pulverized quartz, infusorial earth, tripoli, or by-product silicic acid. This mixture is then calcined in a suitable calcining apparatus, with effective agitation or rabbling, until the solid mineral acidic material ($SiO_2$) replaces the weak organic carbon dioxide ($CO_2$) and the calcium carbonate content of the dolomite is converted into calcium silicate ($CaSiO_3$). The magnesium carbonate content of the dolomite is converted into magnesium oxide (MgO). Carbon dioxide gas ($CO_2$) is evolved in these reactions and may be drawn off from the calcining chamber and conserved in any well-known manner.

The calcination is continued until substantially all of the calcium content of the dolomite has entered into combination with the $SiO_2$ of the mixture and all of the magnesium has been converted into magnesium oxide; that is, until substantially all of the $CO_2$ content of the dolomite has been evolved.

The pulverized silica is preferably added to the dolomite in variant amounts depending upon the calcium content and silica impurity of the dolomite. By experimental attack, it was determined that the added silica reacts with the lime (CaO) preferentially, without entering into reaction with generated MgO, as rapidly as the lime is formed by the calcination of the calcium carbonate content of the dolomite. In order that practical completion of the reaction be assured, the silica is added to the dolomite in quantity somewhat greater than the theoretical equivalence of $SiO_2$ for the CaO content of the dolomite. For example, by the addition of silica in amounts 10% in excess of theoretical requirements, it has been possible to obtain a product carrying $CaSiO_3$ and MgO with only slightly more than 1% of "free" lime.

The generation of the lime (CaO) by the calcination of the $CaCO_3$ content of the dolomite brings a nascent oxide into immediate intimate contact with the silica ($SiO_2$) of the mixture and the effectiveness of the lime-silica reaction is governed by the perfection of the contact between the two solids, freshly generated lime and silica. It is obvious that maximal contact between these two solids is induced by effective rabbling, which can be effected by any suitable means and equipment.

Alternative methods of calcination can be employed in the present process with substantially identical results. It has been determined that the lime-silica reaction can be carried out successfully at a temperature of 850° C. in an atmosphere of steam, or the calcination and silication can be accomplished in an ordinary atmosphere at a temperature of 1000° C. By the introduction of an atmosphere of steam into the calcination chamber, the complete calcination and silication is effected at a temperature 150° C. below that requisite when any other atmosphere is imposed, with a resultant saving in fuel costs and with less disintegration of calcining equipment.

The process is based upon the calcination of intimate mixtures of finely ground dolomite and silica, such as quartz, diatomaceous earth, kieselguhr, tripoli, and by-product silicic acid, to produce a mixture of unfluxed calcium silicate, and magnesium oxide, with only small occurrences of free lime. The conditions imposed bring about the preferential chemical combination between the calcium oxide of the dolomitic calcine and the silica ($SiO_2$) content of the mixture, leaving the magnesium oxide (MgO) uncombined. The proportions of dolomite and silica in the mixture to be calcined are governed by the calcium (Ca) and silicon (Si) content of the particular starting dolomite. The quantity of silica admixed with the raw dolomite, prior to calcination of the mixture, is preferably an amount somewhat in excess of the ratio of 1.07 part by weight of silica ($SiO_2$) to one part of the calcium oxide (CaO) component of the dolomite.

During the calcination of the dolomite-quartz mixture, the liberation of carbon dioxide ($CO_2$) from the dolomite and the reaction between the generated lime and the silica, with resultant formation of calcium silicate, are substantially simultaneous, or concurrent phenomena. Since the formation of the calcium silicate is primarily the result of surface contact between the lime (CaO) and silica ($SiO_2$) solids, I prefer to use silica in quantity approximately 10% in excess of the theoretical requirement for formation of calcium silicate ($CaSiO_3$), so as to bring all of the lime into silicate combination speedily in an agitated mixture. That is, I seek to obtain a calcine of minimal free lime content. In imposing the preferred ratio of admixed silica ($SiO_2$) to the calcium oxide (CaO) content of the raw dolomite prior to calcination of the mixture, under temperature and other conditions to be stipulated, allowance is made for the silica content of the raw dolomite.

Particularly, it is to be stressed that the preferential reaction between the added silica ($SiO_2$) and the generated lime (CaO) was sought in a mixture without inducing the fluxation whereby the MgO would be dispersed in the calcium silicate melt.

Calcination to effect the desired reaction, without bringing the mixture to molten condition, was effected under two sets of conditions:

(a) The finely ground intimate mixture of quartz and dolomite was calcined, with rabbling, at 1000° C. in ordinary atmosphere until complete calcination of the dolomite and silication of the generated lime (CaO) had been effected, the conditions imposed being essentially the same as those requisite for the single-purpose calcination of dolomite into its oxides of calcium and magnesium, i. e., CaO and MgO.

(b) The finely ground intimate mixture of quartz and dolomite was calcined, with rabbling, at 850° C., in an atmosphere of steam.

The requirements as to time and agitation are substantially identical for procedures (a) and (b), and the two methods of calcination produce substantially identical products. The calcination of the dolomite-quartz mixture in an atmosphere of steam assures reaction between the liberated lime (CaO) and the silica ($SiO_2$) of the mixture at a temperature of 150° C. below the temperature required by that reaction when the calcination is conducted in ordinary atmosphere. One novel feature of the process is that this empirically determined advantage is attributable to the catalytic effect of the steam in bringing about a substantial lowering of temperature (150° C.), requisite for the silication reaction, represented by the equation, $CaO + SiO_2 \rightarrow CaSiO_3$.

The products obtained by processes (a) and (b), from a common starting dolomite containing 51.9% of $CaCO_3$, 38.4% of $MgCO_3$ and 7.7% of quartz, are cited as examples of the effectiveness of the two procedures. One part of the dolomite of the above stipulated analysis was mixed with 0.27 part of quartz. One hundred and fifty parts of this dolomite-quartz mixture were calcined by procedure (a), with a resultant calcine of 100 parts, or a loss of 33⅓% due to evolved carbon dioxide. The same result was obtained when 100 parts of the mixture were calcined by procedure (b). Analyses of the calcium silicate-magnesium oxide calcines from processes (a) and (b) showed respective free-lime contents of 1.23% and 1.26%, whereas both calcines contained 21.7% of magnesium oxide as such.

The solid product derived from the present process is a mixture of high grade calcium silicate and magnesium oxide, whereas a by-product of carbon dioxide gas of unusual concentration and purity is obtained. The carbon dioxide evolved by the reaction amounts to substantially all of the carbon dioxide present in the original dolomite and can be collected in any suitable fashion from the calcining chamber and utilized commercially. The magnesium oxide in the mixture of calcium silicate and magnesium oxide can be separated out of the mixture by either chemical or mechanical means.

It will be apparent to one versed in the art that the replacement of the $CO_2$ of the $CaCO_3$ content of the starting dolomite by $SiO_2$ represents a decided improvement over the prior art. In the prior art, dolomite is calcined completely to oxides of calcium and magnesium, the subsequent slaking of these oxides being followed by their suspension in water and the return of the conserved $CO_2$ to effect reversion of the calcium oxide to carbonate and dissolution of the magnesium oxide into a solution of magnesium bicarbonate. When the calcium silicate-magnesium oxide of the present invention is suspended in water and the conserved carbon dioxide is passed into the suspension, all of the carbon dioxide ($CO_2$) is available for the dissolution of the magnesium oxide from the silicate-oxide calcine, without any appreciable solvent action by the carbonated water upon the solid calcium silicate.

The products of the present process are of good commercial quality and are susceptible of numerous applications in various industries.

The present invention is susceptible of numerous modifications without departing from the spirit thereof. Attention is directed to the appended claims for limiting its scope.

What is claimed is:

1. A method of processing dolomite which comprises pulverizing dolomite, adding thereto silica in an amount of approximately 1.07 parts by weight of silica to 1 part of CaO contained in the dolomite, and calcining the mixture at a temperature of from approximately 850° C. to 1000° C., with agitation, until substantially all of the calcium and magnesium carbonates contained in the dolomite are converted respectively into calcium silicate and magnesium oxide.

2. A method of processing dolomite which comprises pulverizing dolomite, adding thereto pulverized quartz in an amount of approximately 1.07 parts by weight of quartz to 1 part of CaO contained in the dolomite and calcining the mixture at a temperature of 850° C. to 1000° C., with agitation, until substantially all of the calcium carbonate content of the dolomite is converted into calcium silicate and the magnesium carbonate content converted into magnesium oxide.

3. A method of processing dolomite which comprises pulverizing dolomite, adding thereto infusorial earth in an amount of approximately 1.07 parts by weight of infusorial earth to 1 part of CaO contained in the dolomite and calcining the mixture at a temperature of from 850° C. to 1000° C., with agitation, until substantially all of the calcium carbonate content of the dolomite is converted into calcium silicate and the magnesium carbonate content converted into magnesium oxide.

4. A method of processing dolomite which comprises pulverizing the dolomite, adding silica thereto in an amount of approximately 1.07 parts by weight of silica to 1 part of CaO contained in the dolomite and calcining the mixture at approximately 1000° C., with agitation, until substantially all of the calcium carbonate content of the dolomite has been converted into calcium silicate and the magnesium carbonate content converted into magnesium oxide.

5. A method of processing dolomite which comprises pulverizing the dolomite, adding thereto silica in an amount about 10% in excess of the equimolar proportions of $SiO_2$ to the CaO content of the dolomite, and calcining the mixture at a temperature of substantially 1000° C., with agitation, until substantially all of the $CO_2$ contained in the dolomite is evolved and a mixture of $CaSiO_3$ and MgO is produced.

6. A method of processing dolomite which comprises pulverizing dolomite, adding to the dolomite pulverized quartz in an amount about 10% in excess of the equimolar proportion of $SiO_2$ to the CaO content of the dolomite, and calcining this mixture, with agitation, until substantially all of the lime produced by calcination of the dolomite has combined with the $SiO_2$ of the quartz to form $CaSiO_3$.

7. A method of processing dolomite which comprises pulverizing dolomite, adding to the dolomite silica in an amount approximately 10% in excess of the equimolar proportion of $SiO_2$ to the CaO content of the dolomite, and calcining the mixture at a temperature of approximately 850° C., with agitation, in an atmosphere of steam until substantially all of the $CO_2$ contained in the dolomite is evolved and a mixture of $CaSiO_3$ and MgO is produced.

8. A method of processing dolomite which comprises pulverizing dolomite, adding thereto pulverized quartz in an amount about 10% in excess of the equimolar proportion of $SiO_2$ to the CaO content of the dolomite, and calcining the mixture at approximately 850° C. in an atmosphere of steam, with agitation, until substantially all of the calcium carbonate content of the dolomite is converted into calcium silicate and the magnesium carbonate content converted into magnesium oxide.

9. A method of processing dolomite which comprises pulverizing dolomite, adding silica thereto in an amount of approximately 1.07 parts by weight of silica to 1 part of CaO contained in the dolomite and calcining the mixture at approximately 850° C. in an atmosphere of steam, with agitation, until substantially all of the calcium carbonate content of the dolomite has been converted into calcium silicate and the magnesium carbonate content converted into magnesium oxide.

WALTER H. MacINTIRE.